(12) United States Patent
Poehnl et al.

(10) Patent No.: US 10,375,151 B2
(45) Date of Patent: Aug. 6, 2019

(54) METHOD FOR OPERATING A GATEWAY IN A HIERARCHICAL HETEROGENEOUS NETWORK BY COMPARING OFFER MESSAGES AND SEARCH MESSAGES RECEIVED AT THE GATEWAY REGARDING A SERVICE TO DETERMINE IF THE MESSAGES RELATE TO THE SAME SERVICE AND FORWARDING SEARCH MESSAGES THAT DO NOT RELATE

(71) Applicant: Robert Bosch GmbH, Stuttgart (DE)

(72) Inventors: Michael Poehnl, Wurmberg (DE); Marco Andreas Wagner, Leonberg (DE); Timo Lothspeich, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 387 days.

(21) Appl. No.: 15/244,282

(22) Filed: Aug. 23, 2016

(65) Prior Publication Data

US 2017/0063971 A1    Mar. 2, 2017

(30) Foreign Application Priority Data

Aug. 26, 2015 (DE) .................... 10 2015 216 284

(51) Int. Cl.
*H04L 29/08* (2006.01)
*H04L 12/02* (2006.01)
*H04L 29/12* (2006.01)

(52) U.S. Cl.
CPC .............. *H04L 67/10* (2013.01); *H04L 12/02* (2013.01); *H04L 61/2007* (2013.01)

(58) Field of Classification Search
CPC ...... H04L 67/10; H04L 61/2007; H04L 12/02
See application file for complete search history.

(56) References Cited

U.S. PATENT DOCUMENTS

| 6,970,869 | B1* | 11/2005 | Slaughter | .............. G06F 9/5055 |
| 7,370,091 | B1* | 5/2008 | Slaughter | ................ H04L 67/16 709/220 |
| 7,412,518 | B1* | 8/2008 | Duigou | ................... H04L 67/16 707/E17.108 |

(Continued)

FOREIGN PATENT DOCUMENTS

DE    10 2010 042 601 A1    4/2012

*Primary Examiner* — Daniel C. Murray
(74) *Attorney, Agent, or Firm* — Norton Rose Fulbright US LLP; Gerard Mesina

(57) ABSTRACT

A gateway, operable in a hierarchical heterogeneous network, includes at least two interfaces of which at least one is connectable to a lower network level, and the communication protocols in the network provide a message for offering a service and a message for searching for a service, receipt of a message coming in from a lower network level in the gateway at an interface for offering a service, and/or an item of information identifying the offered service, is noted in the interface receiving this message or in a management unit assigned thereto, and receipt of a message from a lower network level in the gateway at an interface for searching for a service and/or an item of information identifying the sought service is noted in the interface or management unit, and if the messages relate to the same service, a message for the service availability is sent via the interface.

15 Claims, 5 Drawing Sheets

(56) References Cited

U.S. PATENT DOCUMENTS

| | | | | |
|---|---|---|---|---|
| 7,805,407 B1* | 9/2010 | Verbeke | ............ | G06F 17/30575 707/634 |
| 8,285,860 B2* | 10/2012 | McGuire | ............. | H04L 61/1511 709/228 |
| 8,925,017 B1* | 12/2014 | Howard, Jr. | ........ | H04N 21/4622 725/51 |
| 2002/0143855 A1* | 10/2002 | Traversat | ................. | G06F 9/4416 709/202 |
| 2003/0095524 A1* | 5/2003 | Stephens | ................. | H04L 29/06 370/338 |
| 2004/0019514 A1* | 1/2004 | Verbeke | ................. | G06Q 10/10 718/105 |
| 2004/0019890 A1* | 1/2004 | Verbeke | ................. | G06F 9/5055 718/100 |
| 2004/0039831 A1* | 2/2004 | Grimminger | ........... | H04L 45/20 709/230 |
| 2004/0098447 A1* | 5/2004 | Verbeke | ................. | G06F 9/5055 709/201 |
| 2005/0193106 A1* | 9/2005 | Desai | .................... | H04W 84/18 709/223 |
| 2005/0249113 A1* | 11/2005 | Kobayashi | .......... | H04L 12/4641 370/219 |
| 2005/0265261 A1* | 12/2005 | Droms | ................ | H04L 12/2801 370/255 |
| 2007/0141986 A1* | 6/2007 | Kuehnel | ................ | H04W 48/16 455/41.2 |
| 2008/0298277 A1* | 12/2008 | Singh | ................. | H04L 12/2801 370/255 |
| 2009/0077217 A1* | 3/2009 | McFarland | ............ | G06Q 10/06 709/223 |
| 2009/0222530 A1* | 9/2009 | Buford | ................. | H04L 12/185 709/217 |
| 2009/0249062 A1* | 10/2009 | Thomas | .............. | H04L 63/0823 713/158 |
| 2010/0010934 A1* | 1/2010 | Barry | ..................... | G06Q 30/02 705/80 |
| 2010/0223376 A1* | 9/2010 | Park | .................... | H04W 36/385 709/224 |
| 2010/0322213 A1* | 12/2010 | Liu | ........................ | H04W 48/16 370/338 |
| 2011/0153773 A1* | 6/2011 | Vandwalle | ............ | H04W 48/08 709/217 |
| 2011/0153818 A1* | 6/2011 | Vandwalle | .............. | H04W 67/16 709/224 |
| 2012/0265871 A1* | 10/2012 | Dowell | ............... | H04L 61/1541 709/224 |
| 2013/0109313 A1* | 5/2013 | Kneckt | ................. | H04W 8/005 455/41.2 |
| 2013/0173388 A1* | 7/2013 | Le | ....................... | G06Q 30/0256 705/14.54 |
| 2013/0322297 A1* | 12/2013 | Dominguez | ............ | H04W 4/21 370/255 |
| 2014/0337544 A1* | 11/2014 | Huang | .................. | G06F 13/385 710/63 |
| 2014/0359148 A1* | 12/2014 | Cherian | .................. | H04L 41/28 709/229 |
| 2015/0081818 A1* | 3/2015 | Ye | ........................... | H04W 4/21 709/206 |
| 2015/0081840 A1* | 3/2015 | Patil | ........................ | H04L 67/28 709/217 |
| 2015/0109981 A1* | 4/2015 | Patil | .................... | H04L 67/1078 370/311 |
| 2016/0142303 A1* | 5/2016 | Kim | ...................... | H04L 65/4084 370/401 |
| 2016/0174134 A1* | 6/2016 | Srinivasa Gopalan | ...................... | H04W 48/14 370/254 |
| 2016/0234758 A1* | 8/2016 | Qi | ........................ | H04W 48/14 |
| 2016/0366718 A1* | 12/2016 | Sadeghi | .................. | H04W 76/14 |
| 2017/0070320 A1* | 3/2017 | Choi | ...................... | H04L 1/245 |
| 2017/0126512 A1* | 5/2017 | Seed | .................. | H04L 41/5045 |
| 2017/0150337 A1* | 5/2017 | Bareket | ................. | H04W 76/14 |
| 2018/0049013 A1* | 2/2018 | Lee | ........................ | H04W 92/18 |
| 2018/0199182 A1* | 7/2018 | Lee | ......................... | H04W 4/08 |
| 2018/0206279 A1* | 7/2018 | Lee | ........................ | H04L 29/08 |

\* cited by examiner

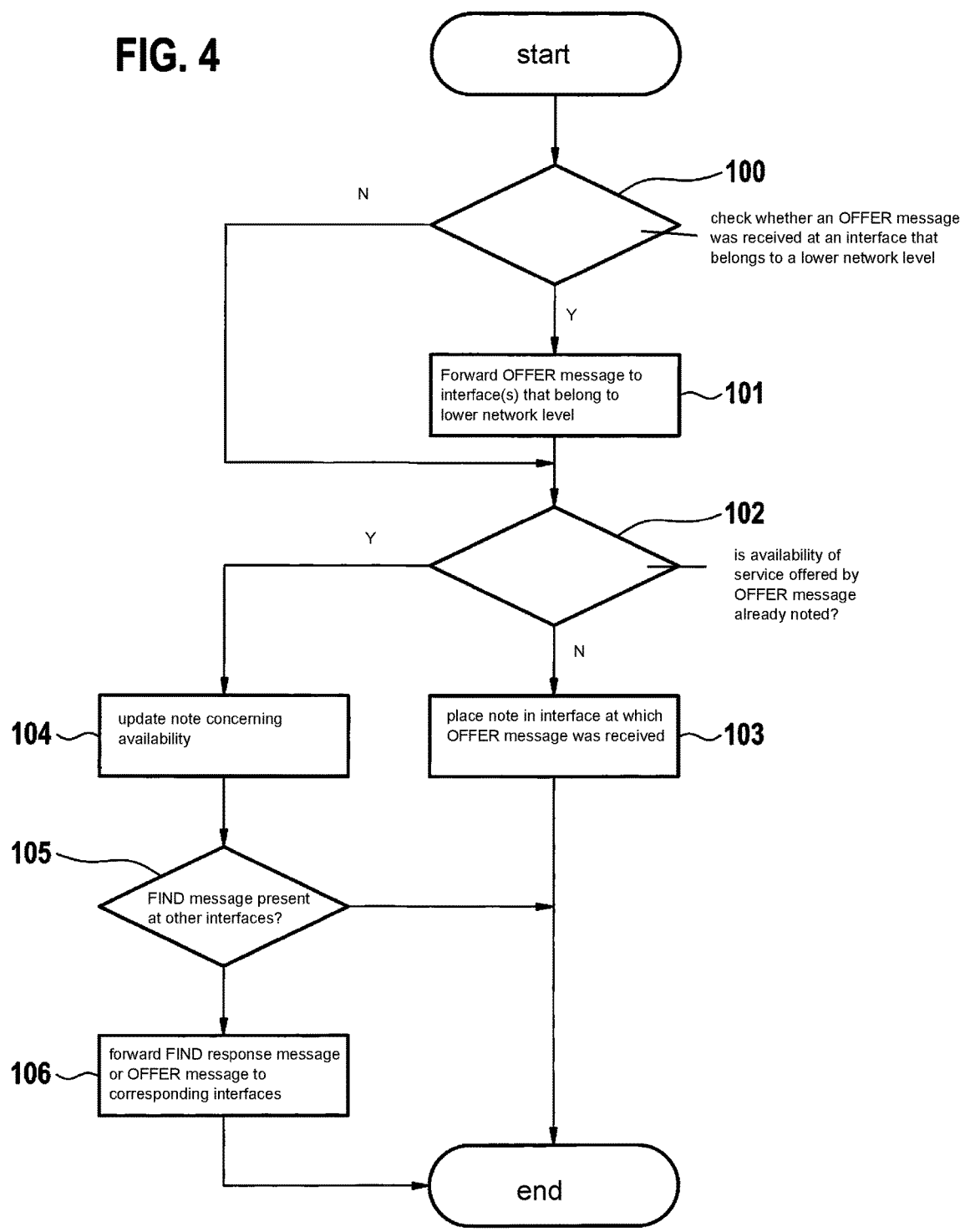

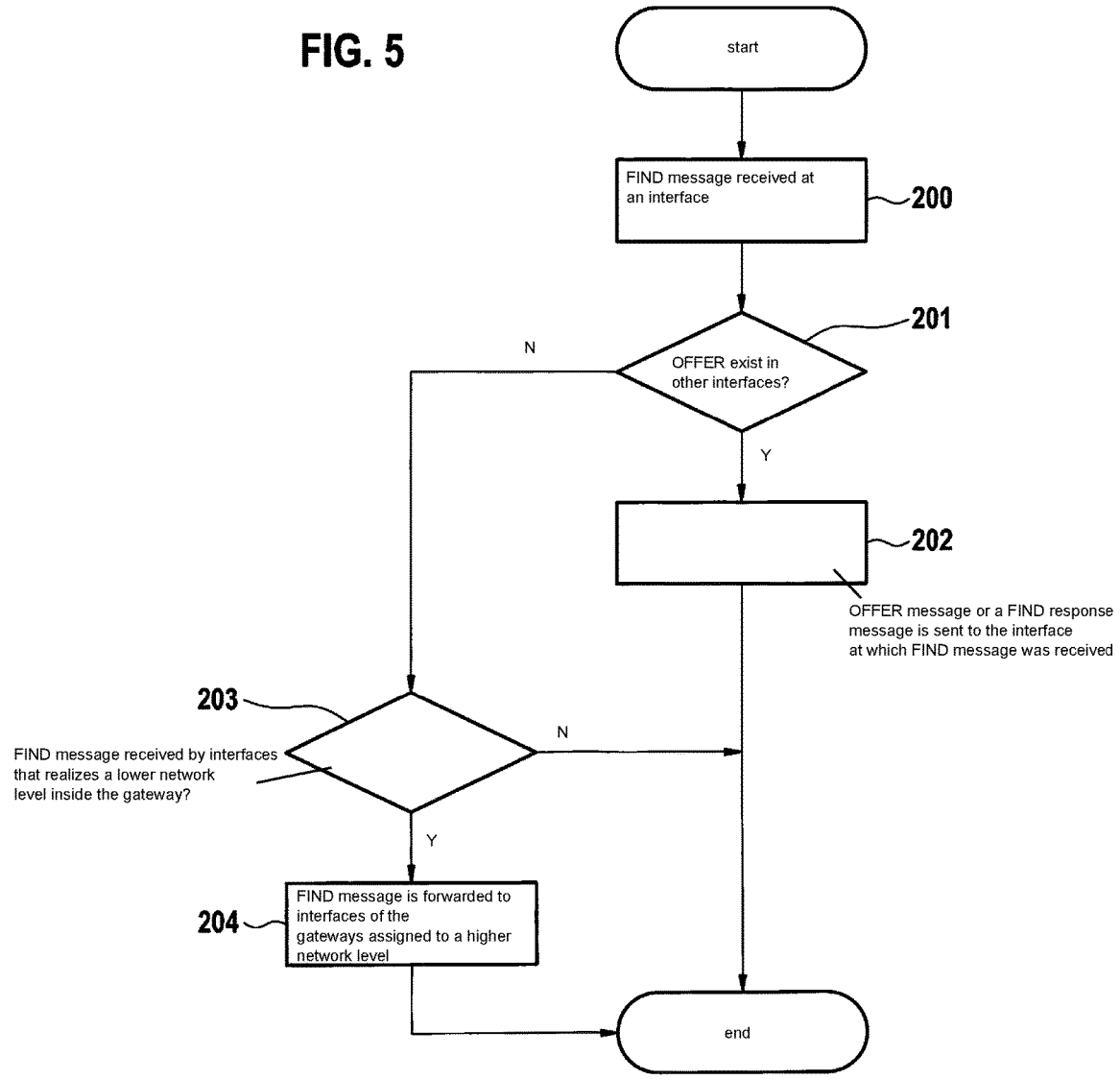

METHOD FOR OPERATING A GATEWAY IN A HIERARCHICAL HETEROGENEOUS NETWORK BY COMPARING OFFER MESSAGES AND SEARCH MESSAGES RECEIVED AT THE GATEWAY REGARDING A SERVICE TO DETERMINE IF THE MESSAGES RELATE TO THE SAME SERVICE AND FORWARDING SEARCH MESSAGES THAT DO NOT RELATE

RELATED APPLICATION INFORMATION

The present application claims priority to and the benefit of German patent application no. 10 2015 216 284.2, which was filed in Germany on Aug. 26, 2015, the disclosure of which is incorporated herein by reference.

FIELD OF THE INVENTION

The present invention relates to a method for operating a gateway in a hierarchical heterogeneous network, the gateway including at least two interfaces of which at least one interface is capable of being connected to a lower network level, and the protocols provided for communication in the network providing messages for offering a service (referred to as OFFER messages hereinafter) and messages for searching for a service (referred to as FIND messages hereinafter). The present invention also relates to a gateway in a hierarchical heterogeneous network and to a computer program that is stored on a gateway in a hierarchical heterogeneous network.

BACKGROUND INFORMATION

Due to the increasing communication of control devices in many areas of technology, for example in the automotive field, efforts are being made to supplement or expand communication solutions with methods that are built on the technologies designated Ethernet and based on the IP (Internet Protocol) network stack. An example is the so-called SOME/IP (Scalable Service-Oriented Middleware over IP). This is based on the IP network stack and was developed for use in Ethernet networks in vehicles.

A service discovery method makes it possible to resolve the IP address and the port of a sought service in SOME/IP. After the address resolution has taken place, a connection can be created to the node having the corresponding service, and its service can be used. There can be various instances of a service that can be found using a single search request for the particular service. A service discovery method, for example that of SOME/IP, can in principle be initiated from two sides. A node that requires a particular service can initiate the search by sending a search request provided for this purpose (referred to as a FIND message hereinafter). The FIND message contains the description of the sought service (for example a service ID). A provider of this service can react with a response in which the sought service is offered (referred to as an OFFER message hereinafter). However, the initiative can also originate from the provider of a service, so that the provider sends out an OFFER message without a concrete request from a potential subscriber. In this way, a node that requires a particular service can be informed concerning the availability without itself having to send out a search request.

Standardly, the SOME/IP protocol is not designed for a routing over different subnetworks having different address regions. Because the addresses valid only in a subnetwork are contained in the protocol header, a gateway between two subnetworks has to adapt the address information. This is a problem that is also known from other network protocols. A proposal for the operation of a gateway so as to solve this problem is not contained in the SOME/IP specification. The use of SOME/IP for the bus systems CAN and FlexRay, widely used in vehicle systems, is seen as not practicable, and for this reason only particular Ethernet subnetworks are addressed in a vehicle.

Patent document DE 10 2010 042 601 A1 discusses a method for distributing information in hierarchically constructed networks. Here, nodes of one level communicate to the assigned node of the next-higher level which information they provide and which information they require. In this way, it is possible to realize a hierarchically constructed distribution of information. In this known method, the communication in a subnetwork always runs via the assigned node of the higher level. The method of DE 10 2010 042 601 A1 starts from the assumption that a node knows which information it requires. The node sends this information concerning an offered service without a previous request by a consumer or subscriber. This means that the requirement is known ahead of time, and a static configuration is thus present. As a consequence, a particular area node knows which information the nodes below it provide and require. In this way, it can ascertain the need for information that has to be requested from the next-higher level, because it is not available at the lower level. The presence of a plurality of instances capable of offering a particular service is however not provided in the known method.

Moreover, this method has disadvantages in a dynamic environment in which for example the individual nodes become active temporally independently of one another. This is because the information actually supplied and required by the lower-level nodes is not known until all nodes have communicated this. Thus, a static configuration is disadvantageous in particular given dynamically changing lower-level nodes.

SUMMARY OF THE INVENTION

The method having the features described herein enables the configuration of heterogeneous hierarchical networks having plug-and-play properties, because the communication relations can be automatically produced via a distributed service discovery method. Here, the service providers and the subscribers to services are decoupled in such a way that no information is required concerning the concrete address or the protocol by which a particular service can be reached. In addition to this spatial decoupling, there is also a temporal decoupling, because there does not have to be any particular sequence in which a service provider and a subscriber become active in the network.

The service discovery method according to the present invention is configured such that as few messages as possible have to be sent in the lower levels of the hierarchically constructed network. This is advantageous for example for networks in which the available bandwidth increases in higher levels, and in which bus systems having lower-bandwidth network technologies are used at lower levels (for example a CAN bus). Such an architecture can advantageously be used in vehicle networks in which individual domains built on bus systems such as CAN or FlexRay can be connected via an Ethernet backbone.

With the method according to the present invention, it is possible to train the communication relations between control devices in a vehicle at the end of line, or in targeted fashion after a modification. This saves expense during the management of variants, the planning of the communication relations, and the configuration of the gateways. The possibilities for an update of existing software components, or a download of new software components, in a control device are also improved. If such a modification requires an adaptation of the communication relations between the control devices, this can take place automatically, and the gateways between the subnetworks can also be automatically adapted.

In addition, through a service description defined beyond protocol boundaries, for example in the form of a service ID, most protocol-specific service discovery messages on a gateway can be logically translated. This enables the construction of hierarchical networks that can be made up of subnetworks having different network technologies and network protocols.

In comparison to SOME/IP, the described method is not defined for a particular protocol, in particular when a common description of a service is provided (for example by a service ID). On the gateways that connect different subnetworks, a protocol translation can take place. The service discovery method and the service-oriented communication based thereon can thus be applied to the overall network, and not only in a subnetwork. This means that, using the described method, the use of the SOME/IP protocol can be expanded to a more complex network made up of subnetworks having different address regions. A subnetwork based on SOME/IP can in addition be connected to other subnetworks that use other network technologies and/or network protocols (for example CAN bus).

In contrast to the method of DE 10 2010 042 601 A1, the method described here enables a dynamic adaptation of the distribution of information, because it does not have to be known ahead of time which information a node sends. Rather, the information is subscribed to as needed. If there are no subscribers, or no one who is requesting the service, the corresponding information, or service offer, also does not have to be sent. In addition, with the presented method services can be found directly on a network level and information concerning them can be exchanged. In addition, with the presented method it is also possible to have a plurality of providers of a service, and those looking for the service can decide for one or more of these service providers.

In the further descriptions herein, additional advantageous developments and improvements of the method described in main descriptions herein are indicated. Through the measures described in the further descriptions herein, in particular different network architectures can be supported, different or redundant paths can be found, and it is possible to react differently to modifications of the network topology.

Further features, applications, and advantages of the present invention result from the following description of exemplary embodiments, explained on the basis of the drawings; the features can be important for the present invention both by themselves and also in various combinations, without this being explicitly indicated.

BRIEF DESCRIPTION OF THE DRAWINGS

FIG. 4 shows a flow diagram with possible method steps in the processing of an OFFER message.

FIG. 5 shows a flow diagram with possible method steps in the processing of a FIND message.

DETAILED DESCRIPTION

Figure 1:
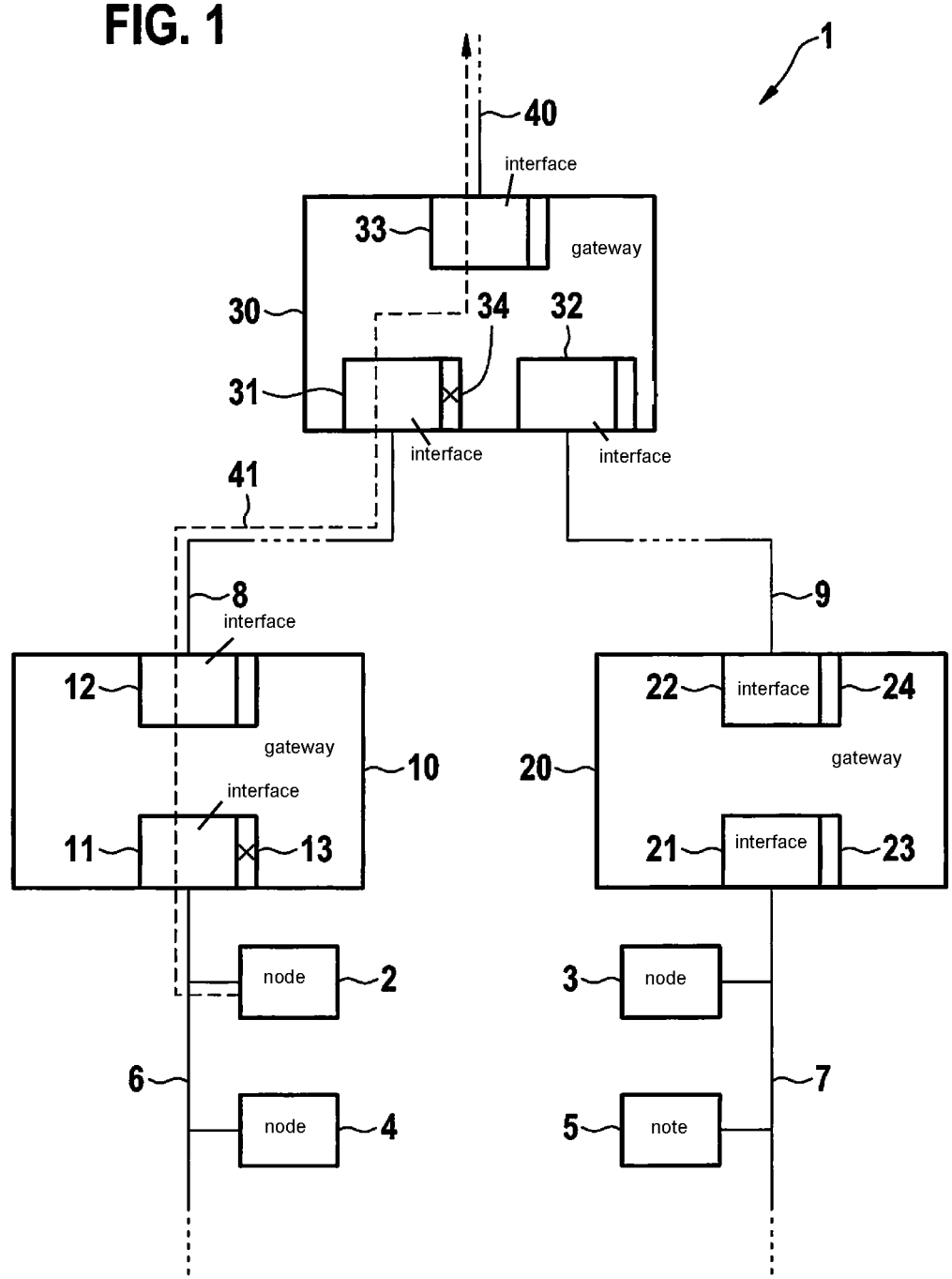
FIG. 1 shows a block diagram representing a segment of a hierarchical network in which a provider has sent an OFFER message.

FIG. 1 schematically shows a segment of a hierarchical heterogeneous network 1 in which nodes 2, 3, 4, and 5 are shown as examples. Nodes 2 and 4 are connected to a gateway 10 via a subnetwork 6, and nodes 3 and 5 are connected to a gateway 20 via a subnetwork 7, for example a bus system. Gateway 10 is connected to a gateway 30 via a subnetwork 8, and gateway 20 is also connected to gateway 30 via a subnetwork 9. In gateway 10, there is fashioned an interface 11 that is connected to subnetwork 6, which realizes a lower network level. A further interface 12 of gateway 10 is connected to a higher network level 8. Gateway 20 is fashioned analogously to gateway 10. An interface 21 is connected to subnetwork 7, which is a lower network level, and an interface 22 is connected to subnetwork 9, which is a higher network level.

In gateway 30 there are fashioned two interfaces 31 and 32 connected to subnetworks 8 or 9. Here, subnetworks 8 and 9 form a lower network level relative to a subnetwork 40 that is connected to an interface 33 of gateway 30.

In FIG. 1, path 41 of an OFFER message, sent by the provider of a particular service, is shown by a dashed arrow. The OFFER message is conducted from node 2 via the subnetwork or bus system 6 to interface 11 of gateway 10. This takes place for example in the form of a multicast or broadcast message. If gateway 10 receives this OFFER message, it notes the availability of the offered service at interface 11 at which the message was received, in the form of a corresponding note 13 in the interface, or in a management unit assigned to this interface. The management unit may be configured in the gateway and manages the entries or notes of all interfaces of this gateway. Analogously, a management unit can also be provided for the other gateways. Note 13 can also contain, alongside the designation of the interface at which the OFFER message was received, the concrete address of node 2 from which the OFFER message was sent in subnetwork 6.

The OFFER message received at interface 11 is forwarded in gateway 10 to interface 12 that is connected to subnetwork 8, subnetwork 8 being a higher network level than subnetwork 6. From interface 12, the OFFER message is forwarded to interface 31 of gateway 30 and, corresponding to note 13, a note 34 is stored in a region of interface 31 or in a management unit assigned to this interface. Because subnetwork 40 realizes a higher network level relative to subnetwork 8, the OFFER message inside gateway 30 is forwarded to subnetwork 40 via interface 33. If additional gateways are present there, then the OFFER message is also forwarded in these gateways from the respectively lower network level to the respectively higher network level.

Figure 2:
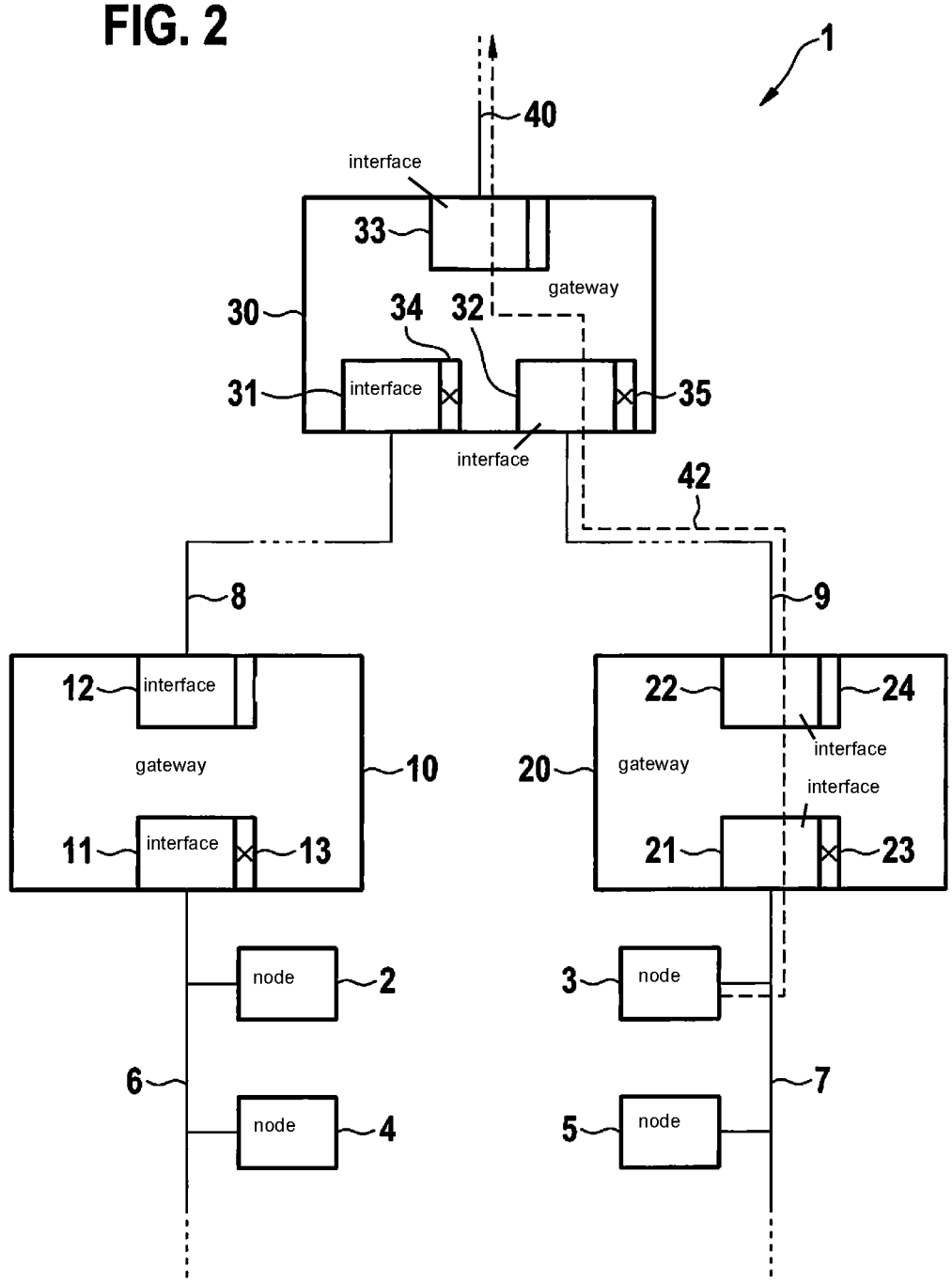
FIG. 2 shows a block diagram of a segment of a hierarchical network in which a FIND message has been sent.

FIG. 2 shows a possible path 42 of a FIND message. The FIND message is sent from node 3 via subnetwork 7, for example as a multicast or broadcast, and thus indicates that node 3 is looking for a service. The FIND message is forwarded to gateway 20. In interface 21, connected to subnetwork 7, of gateway 20, a note 23 is entered that indicates the receipt of FIND message 42. This note marks the need for the service sought with the FIND message at interface 21. In addition to the information that interface 21 identifies, the concrete address of the requesting node 3 from subnetwork 7 can also be stored in note 23.

In accordance with the rule that FIND messages from a lower network level are forwarded inside a gateway to the higher network levels, the FIND message is forwarded from interface 21 in gateway 20 to interface 22, which is connected to subnetwork 9, because subnetwork 9 is a higher network level relative to subnetwork 7. Via subnetwork 9, the FIND message reaches interface 32 of gateway 30. In interface 32, or in a management unit assigned to this interface 32, a note 35 concerning the receipt of the FIND message is stored, analogously to interface 21. Inside gateway 30, the FIND message is forwarded to interface 33, which is connected to subnetwork 40, which is a higher network level relative to subnetwork 9.

Figure 3:
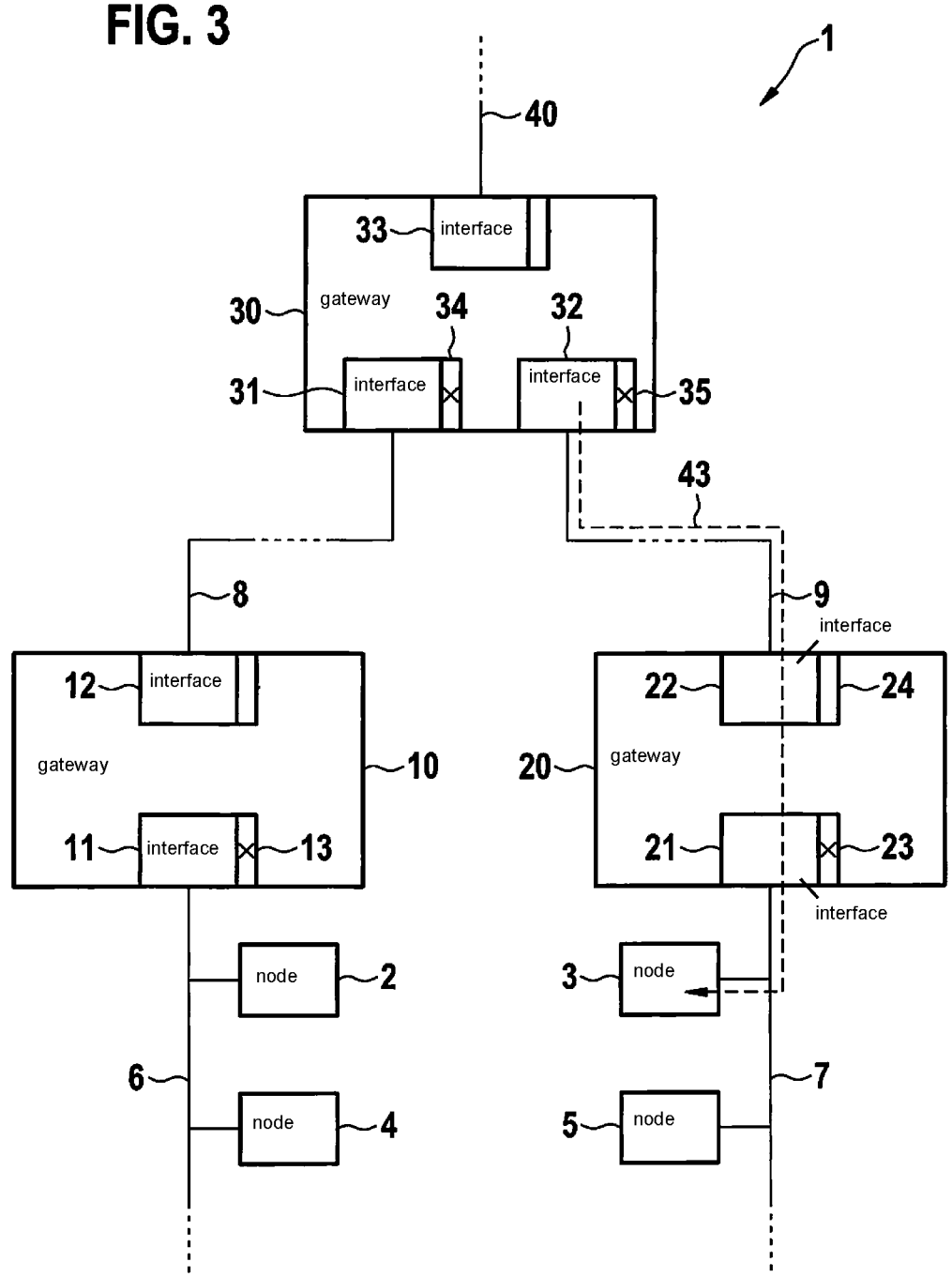
FIG. 3 shows a block diagram of a segment of a hierarchical network in which a FIND response message or an OFFER message has been sent in response to a FIND message.

FIG. 3 is based on the assumption that an OFFER message and a FIND message, as described in FIGS. 1 and 2, have been sent and the corresponding notes have been stored in the interfaces or in corresponding management units. Through comparison of the entries in the interfaces, or in the management unit assigned to the interfaces, it is now determined that the presence of an OFFER message has been noted, which corresponds to the receipt of the FIND message at interface 32. For this reason, via interface 32 a message corresponding to the received OFFER message is transmitted to subnetwork 9. The path of this message is shown in FIG. 3 as a dashed arrow and is designated with reference character 43.

The message arrives at gateway 20. There, in interface 22 or in a management unit assigned to this interface, a note 24 is stored that represents the receipt of this message. Because the need for the service offer contained in the message is contained in interface 22 of gateway 20, the message is then forwarded inside gateway 20 from interface 22 to interface 21, and from there is sent via subnetwork 7, so that this message reaches node 3. The message can be fashioned as an OFFER message, but can also be fashioned as a specific FIND response message.

According to the sequences shown in FIGS. 1 through 3, in all gateways between nodes 2 and 3, notes, or entries concerning availability, are stored that represent the service. These can be used to convey requests or messages for the subscription to the service from node 3 to node 2. These notes or entries can also be used or expanded in order to convey the data packets sent after the service discovery and the subscription.

If requesting node 3 first becomes active, and then offering node 2 becomes active, corresponding search requests are present already before the appearance of the provider at the gateways. As soon as the provider sends the first OFFER message, these entries trigger a forwarding to the requester (node 3).

The OFFER messages may be sent from higher to lower network levels only as a response to concrete requests, thus avoiding unnecessary messages to the respectively lower network levels. FIND messages are sent only through the subnetworks that have to be passed through in order to find a particular service, and also later for the data transport.

FIG. 4 shows method steps that can run in a gateway in order to process an incoming OFFER message. In a step 100, it is checked whether an OFFER message was received at an interface that belongs to a lower network level. If this is the case, then in a step 101 this OFFER message is forwarded to the interface or interfaces that are connected to a higher network level. In step 102, it is checked whether an availability of the service offered by the received OFFER message is already noted on this gateway. If this is the case, in step 104, the note, or entry concerning availability, is updated in the corresponding interface. If this service is not yet available on the gateway, i.e. no note exists that identifies this service as available, then in a step 103 a corresponding note is placed in the interface at which the OFFER message was received.

In a step 105, it is checked whether FIND messages, i.e. outstanding search requests for the service corresponding to the received OFFER message, are present at other interfaces. If this is the case, then in a step 106 a FIND response message or an OFFER message is forwarded to the corresponding interfaces that identify path 42 of the FIND messages.

FIG. 5 shows possible method steps in the processing of a FIND message in a gateway. In step 200, it is assumed that a FIND message has been received at an interface of the relevant gateway. A note is then entered or updated.

In a step 201, it is checked whether there exist, at other interfaces, OFFER messages matching this FIND message, i.e. whether, at another interface, a note is already stored that indicates the availability of the requested service. If this is the case, then in step 202 an OFFER message or a FIND response message is sent to the interface at which the FIND message was received in step 200. Otherwise, in a step 203 it is checked whether the FIND message was received by an interface that realizes a lower network level inside the gateway. Only if this is the case, then in a step 204 this FIND message is forwarded to the interfaces of the gateways that are assigned to a higher network level.

Of course, further specific embodiments are possible that develop the specific embodiments shown as examples in FIGS. 1 through 5. For example, the notes, or availability entries and search entries, can be provided with a temporal validity. This permits dynamic modification in the network topology. The provider of a service, as well as possible subscribers or requesters of a service, can use cyclically sent OFFER messages and FIND messages to communicate the offers or their need. If these messages are not present, then the corresponding notes, or availability and request entries, are deleted in the interfaces of the gateways after the next time interval. Relevant nodes that have subscribed to a service can be informed if a service is no longer offered.

According to a further possible specific embodiment, a FIND message that relates to a corresponding availability entry in a gateway is no longer forwarded; rather, a FIND response message, or an OFFER message, is merely sent to the requesting node. Alternatively, in the case of agreement of a FIND message with an OFFER message, the FIND message can nonetheless be forwarded. In some circumstances this makes it possible to find alternative paths, or to update the availability entries.

It is also conceivable, according to alternative strategies, to forward FIND messages and OFFER messages upon receipt at an interface that is assigned to a higher network level. In this way, for example additional paths can be found, or particular network topologies can be supported. Corresponding strategies for avoiding routing loops are then however necessary.

In addition, it is conceivable to configure FIND messages and OFFER messages for example through a corresponding header field in such a way that it is possible to limit the region of the network in which a service is offered or within which a service is sought. It is conceivable that a service be offered only in a subnetwork in which the provider is actually present. A gateway configured in this way would then not forward the OFFER message. This achieves the result that in subnetworks in which particular services are not required, these services are also not offered.

According to a further possible specific embodiment, it can be provided that a FIND response message or an OFFER message sent after the matching of a search entry with an availability entry is sent as a multicast, broadcast, or unicast. In the case of a unicast, the service would then be offered precisely to the node that initiated the search request or FIND message.

In order to save additional bandwidth, it can be provided that a gateway carries out the forwarding of FIND messages and OFFER messages only after expiration of a specified time interval. In this way, a plurality of different FIND messages and OFFER messages can be sent in a common message, and the overhead of protocol layers situated thereunder can be reduced. The same information can also be prevented from being sent multiple times in a particular time interval.

In addition, in principle more instances of a service can be present in a network. Using a FIND message, it is then possible to search for a particular instance, or for all available instances, of a service. If all available instances are sought, FIND messages are generally forwarded in order to find all instances in the network. Thus, such a FIND message can be followed by a plurality of OFFER messages for various instances. As already mentioned, instead of sending an OFFER message in case of an agreement with a FIND message, it is also possible to send a FIND response message that represents a particular message type that specifically describes the situation of agreement of a search request with a service offer. Thus, a distinction in the processing of OFFER messages is possible that are forwarded upward in the network hierarchy and the responses to search requests when agreement has taken place, that are sent to lower levels as needed. In this way, a simpler realization of the method, and in particular a simplified realization of the requests inside the gateway, is enabled.

Of course, the developments named above can be combined with one another.

What is claimed is:

1. A method for operating a gateway in a hierarchical heterogeneous network, the method comprising:
   receiving, by the gateway, at a first interface of the gateway that interfaces to a first subnetwork, a message for offering a service, the message for offering the service coming in from the first subnetwork, the message for offering the service including an indication of an offered service, the first subnetwork being a network level that is lower in a hierarchy of the hierarchical heterogeneous network than the gateway;
   storing, by the gateway, in the first interface or in a management unit assigned to the first interface, an indication which (i) indicates receipt of the message for offering the service, and/or (ii) identifies the offered service;
   receiving, by the gateway, at a second interface of the gateway that interfaces to a second subnetwork, a message for searching for a service, the message for searching for the service coming in from the second subnetwork, the message for searching for the service including an indication of a sought service, the second subnetwork being different than the first subnetwork, the second network being at a network level that is lower in the hierarchy of the hierarchical heterogeneous network than the gateway;
   storing, in the second interface or in a management unit assigned to the second interface, an indication which (i) indicates receipt of a message coming in from a lower network level in the gateway at an interface for searching for a service, and/or (ii)-identifies the sought service;
   comparing, by the gateway, the offered service with the sought service;
   determining, by the gateway based on the comparing, whether or not the offered service and the sought service relate to the same service;
   based on the determining, when the offered service and the sought service relate to the same service, sending, by the gateway, a message relating to the availability of the service to the second subnetwork via the second interface; and
   based on the determining, when the offered service and the sought service do not relate to the same service, forwarding, by the gateway, the message for searching for a service to a third subnetwork via a third interface, the third subnetwork being at a network level that is higher in the hierarchy of the hierarchical heterogeneous network than the gateway.

2. The method of claim 1, further comprising:
   storing the first interface or the management unit assigned to the first interface an address of a node that sent the message for offering a service which was received by the gateway.

3. The method of claim 2, wherein the message for searching for a service and/or the message for offering a service is sent repeatedly by the node at regular intervals.

4. The method of claim 1, wherein at least one of: (i) the indication stored in the first interface or in a management unit assigned to the first interface, and/or (ii) the indication stored in the second interface or in the management use assigned to the second interface are provided with a temporal validity.

5. The method of claim 1, wherein based on the determining that the offered service and the sought service relate to the same service, the message for searching for a service is not forwarded by the gateway to a higher network level.

6. The method of claim 1, wherein in the sending step, the message relating to the availability of a service is sent to the second subnetwork via the second interface as a multicast, broadcast, or unicast.

7. The method as recited in claim 1, wherein when the offered service and the sought service relate to the same service, the gateway sends the message relating to the availability of the service only to the second subnetwork, and when the offered service and the sought service do not relate to the same service, the gateway sends the message relating to the availability of the service only to the third subnetwork.

8. A method for operating a gateway in a hierarchical heterogeneous network, the method comprising:
   receiving, by the gateway, at a first interface of the gateway that interfaces to a first subnetwork, a message for offering a service, the message for offering the service coming in from the first subnetwork, the message for offering a service including an indication of an offered service, the first subnetwork being at a network level that is lower in a hierarchy of the hierarchical heterogeneous network than the gateway;
   storing, by the gateway, in the first interface or in a management unit assigned to the first interface, an indication which (i) indicates receipt of the message for offering a service, and/or (ii) identifies the offered service;

receiving, by the gateway, at a second interface of the gateway that interfaces to a second subnetwork, a message for searching for a service, the message for searching a service coming in from the second subnetwork, the message for searching for a service including an indication of a sought service, the second subnetwork being different than the first subnetwork, the second subnetwork being at a network level that is lower in the hierarchy of the hierarchical heterogeneous network than the gateway;

storing, in the second interface or in a management unit assigned to the second interface, an indication which (i) indicates receipt of a message coming in from a lower network level in the gateway at an interface for searching for a service, and/or (ii)-identifies the sought service;

comparing, by the gateway, the offered service with the sought service;

determining, by the gateway based on the comparing, that the offered service and the sought service do not relate to the same service; and based on the determining that the offered service and the sought service do not relate to the same service, forwarding, by the gateway, the message for searching for a service to a third subnetwork via a third interface, the third subnetwork being at a network level that is higher in the hierarchy of the hierarchical heterogeneous network than the gateway.

9. The method of claim 8, wherein at least one of the message for offering a service or the message for searching for a service contain an item of information on the basis of which it is determined to which region of the hierarchical heterogeneous network the at least one of the message for offering a service or the message for searching for the service is forwarded.

10. The method of claim 8, wherein a plurality of messages for searching for a service and/or a plurality of messages for offering a service received by the gateway within a specifiable time interval are collected and are then forwarded to the third network within a common message.

11. The method as recited in claim 8, wherein based on the determining that the offered service and the sought service do not relate to the same service, the gateway forwards the message for searching for a service only to the third subnetwork.

12. A gateway device including hardware, the gateway device being configured for operating in a hierarchical heterogeneous network, the gateway device including a first interface for connecting to a first subnetwork, the first subnetwork being at a network level in a hierarchy of the hierarchical heterogeneous network than the gateway device, and including a second interface for connected to a second subnetwork, the second subnetwork being at network level in the hierarchy of the hierarchical heterogeneous network than the gateway device, the first subnetwork being different than the second subnetwork, the gateway device configured to:

receive, at the first interface, a message for offering a service, the message for offering the service coming in from the first subnetwork, the message for offering a service including an indication of an offered service;

store, in the first interface or in a management unit assigned to the first interface, an indication which (i) indicates receipt of the message for offering a service, and/or (ii) identifies the offered service;

receive, at the second interface, a message for searching for a service, the message for searching a service coming in from the second subnetwork, the message for searching for a service including an indication of a sought service;

store, in the second interface or in a management unit assigned to the second interface, an indication which (i) indicates receipt of a message coming in from a lower network level in the gateway at an interface for searching for a service, and/or (ii)-identifies the sought service;

compare the offered service with the sought service;

determine, based on the comparing, whether or not the offered service and the sought service do not relate to the same service;

based on the determination, when the offered service and the sought service relate to the same service, send a message relating to the availability of the service to the second subnetwork via the second interface; and based on the determination, when the offered service and the sought service do not relate to the same service, forward the message for searching for a service to a third subnetwork via a third interface of the gateway device, the third subnetwork being at a network level that is higher in the hierarchy of the hierarchical heterogeneous network than the gateway.

13. The gateway device as recited in claim 12, wherein when the offered service and the sought service relate to the same service, the gateway sends the message relating to the availability of the service only to the second subnetwork, and when the offered service and the sought service do not relate to the same service, the gateway sends the message relating to the availability of the service only to the third subnetwork.

14. A non-transitory computer readable medium on which is stored program code for operating a gateway in a hierarchical heterogeneous network, the program code, when executed by a computer, causing the computer to perform:

receiving, by the gateway, at a first interface of the gateway that interfaces to a first subnetwork, a message for offering a service, the message for offering the service coming in from the first subnetwork, the message for offering a service including an indication of an offered service, the first subnetwork being at a network level that is lower in a hierarchy of the hierarchical heterogeneous network than the gateway;

storing, by the gateway, in the first interface or in a management unit assigned to the first interface, an indication which (i) indicates receipt of the message for offering a service, and/or (ii) identifies the offered service;

receiving, by the gateway, at a second interface of the gateway that interfaces to a second subnetwork, a message for searching for a service, the message for searching a service coming in from the second subnetwork, the message for searching for a service including an indication of a sought service, the second subnetwork being different than the first subnetwork, the second subnetwork being at a network level that is lower in the hierarchy of the hierarchical heterogeneous network than the gateway;

storing, in the second interface or in a management unit assigned to the second interface, an indication which (i) indicates receipt of a message coming in from a lower network level in the gateway at an interface for searching for a service, and/or (ii)-identifies the sought service;

comparing, by the gateway, the offered service with the sought service;

determining, by the gateway based on the comparing, whether or not the offered service and the sought service relate to the same service;

based on the determining, when the offered service and the sought service relate to the same service, sending, by the gateway, a message relating to the availability of the service to the second subnetwork via the second interface; and based on the determining, when the offered service and the sought service do not relate to the same service, forwarding, by the gateway, the message for searching for a service to a third subnetwork via a third interface, the third subnetwork being at a network level that is higher in the hierarchy of the hierarchical heterogeneous network than the gateway.

15. The non-transitory computer readable medium as recited in claim 14, wherein when the offered service and the sought service relate to the same service, the gateway sends the message relating to the availability of the service only to the second subnetwork, and when the offered service and the sought service do not relate to the same service, the gateway sends the message relating to the availability of the service only to the third subnetwork.

* * * * *